United States Patent
Fickle et al.

(10) Patent No.: US 7,921,448 B2
(45) Date of Patent: Apr. 5, 2011

(54) MULTICAST MEDIA DISTRIBUTION SYSTEM

(75) Inventors: Richard C. Fickle, Sedalia, CO (US);
José A. Róyo, Venice, CA (US);
Timothy Bruce Aron, Santa Monica, CA (US)

(73) Assignee: Ascent Media Group, LLP, Santa Monica, CA (US)

( * ) Notice: Subject to any disclaimer, the term of this patent is extended or adjusted under 35 U.S.C. 154(b) by 2192 days.

(21) Appl. No.: 10/692,082

(22) Filed: Oct. 22, 2003

(65) Prior Publication Data

US 2004/0255335 A1 Dec. 16, 2004

Related U.S. Application Data

(60) Provisional application No. 60/429,966, filed on Nov. 27, 2002.

(51) Int. Cl.
*H04N 7/173* (2011.01)
(52) U.S. Cl. ............... 725/95; 725/48; 725/82; 725/86; 725/87; 725/91; 725/103; 725/114; 725/138; 725/144
(58) Field of Classification Search ............... 725/95, 725/48, 82, 86, 87, 91, 103, 114, 138, 144
See application file for complete search history.

(56) References Cited

U.S. PATENT DOCUMENTS

| | | | |
|---|---|---|---|
| 5,767,895 A * | 6/1998 | Yashiro et al. ............... 725/106 |
| 5,990,941 A | 11/1999 | Jackson et al. | |
| 6,118,976 A * | 9/2000 | Arias et al. ............... 725/118 |
| 6,151,321 A * | 11/2000 | Benson et al. ........... 370/395.42 |
| 6,216,265 B1 | 4/2001 | Roop et al. | |
| 6,222,530 B1 | 4/2001 | Sequeira | |
| 6,305,019 B1 * | 10/2001 | Dyer et al. ............... 725/91 |
| 6,335,927 B1 | 1/2002 | Elliott et al. | |
| 6,384,850 B1 | 5/2002 | McNally et al. | |
| 6,477,707 B1 * | 11/2002 | King et al. ............... 725/97 |
| 6,529,706 B1 * | 3/2003 | Mitchell ............... 455/12.1 |
| 6,621,870 B1 * | 9/2003 | Gordon et al. ........... 375/240.28 |
| 6,882,793 B1 * | 4/2005 | Fu et al. ............... 386/95 |
| 7,010,801 B1 * | 3/2006 | Jerding et al. ............... 725/95 |
| 7,065,213 B2 * | 6/2006 | Pinder ............... 380/240 |
| 7,065,779 B1 * | 6/2006 | Crocker et al. ............... 725/111 |
| 7,107,606 B2 * | 9/2006 | Lee ............... 725/87 |
| 7,185,352 B2 * | 2/2007 | Hallford et al. ............... 725/28 |
| 2002/0059623 A1 * | 5/2002 | Rodriguez et al. ............... 725/91 |
| 2002/0144279 A1 * | 10/2002 | Zhou ............... 725/95 |
| 2003/0120608 A1 * | 6/2003 | Pereyra ............... 705/64 |
| 2004/0181801 A1 * | 9/2004 | Hagen et al. ............... 725/32 |
| 2004/0226042 A1 * | 11/2004 | Ellis ............... 725/43 |

* cited by examiner

*Primary Examiner* — Brian T Pendleton
*Assistant Examiner* — Nnenna Ekpo
(74) *Attorney, Agent, or Firm* — Blakely Sokoloff Taylor & Zafman, LLP

(57) ABSTRACT

The present invention provides for methods, systems, and devices for simultaneously receiving and processing multimedia asset packages transmitted by a plurality of multimedia content providers. The methods and systems of the present invention implement a multiport catcher appliance configured to receive a plurality of transmissions, simultaneously, from multiple content providers in a multimedia asset distribution system. The multimedia catcher receiver includes a multimedia network interface unit configured to simultaneously receive multimedia data segments from content providers, a multimedia network interface unit that provides the multimedia data segments to a receive unit, a receive unit configured to reconstruct and validate a multimedia asset package using multimedia data segments transmitted by a content provider, and a content management system to manage multimedia asset packages and provide multimedia asset packages to a multimedia server.

29 Claims, 12 Drawing Sheets

| Name | Receive Date | Status | | |
|---|---|---|---|---|
| HeistADI.tar | 04/01/03 | Uploaded | | (Delete) |
| OfficeSpaceADI.tar | 04/01/03 | Queued | | |
| TitanicADI.tar | 04/10/03 | Loading | | |
| 25HourADI.tar | 04/14/03 | Queued | | |
| LaurelCanyonADI.tar | 04/11/03 | Queued | | |
| PlanetADI.tar | 04/08/03 | Pending | (Upload) | (Delete) |
| HeistADI.tar | 04/01/03 | Deleted | | |
| SavingPrivateADI.tar | 04/11/03 | Deleted | | |
| BestInShowADI.tar | 04/11/03 | Pending | (Upload) | (Delete) |

Error Messages

- Name: SavingPrivateADI.tar
- Asset Type: ADI Package
- Description: Insert package for Saving Private Ryan (movie & preview)
- Status: Deleted
- Priority: 4
- Upload Attempts: 1
- Origin: Satellite
- Owner: iN Demand
- Date Received: 10:00 04/11/03
- Date Uploaded: 12:04 04/12/03
- Date Deleted: 14:10 04/12/03

MULTICAST MEDIA DISTRIBUTION SYSTEM

CROSS-REFERENCE TO RELATED APPLICATIONS

This application claims benefit of provisional Application No. 60/429,966, filed Nov. 27, 2002, the disclosure of which is fully and expressly incorporated herein by reference.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to multimedia content distribution systems and methods, and specifically to multimedia content distribution systems and methods that provide for simultaneous reception of multiple multimedia data streams from different sources.

BACKGROUND

With the development of digital technologies, cable television services are increasingly providing their customers with video-on-demand ("VOD") services. In a typical VOD system, the cable multiple service/systems operator ("MSO") receives movies from content providers, stores the movies locally, and then transmits a movie to a viewer upon the viewer's request. Content providers generally transmit movies to MSOs via satellite transmissions or via a high-speed terrestrial network using appliances commonly referred to as pitchers. To receive the transmissions from the content providers, MSOs deploy a number of appliances commonly referred to as catchers. Catchers receive the transmissions from the content providers and, after receiving a complete package, relays the package to a VOD server.

Current VOD systems require a one-to-one pitcher-to-catcher ratio. That is, current catchers are incapable of receiving multiple, simultaneous transmissions from more than one pitcher or uplink facility. Consequently, MSOs typically deploy multiple catchers, i.e., a farm of catchers, so that they are able to simultaneously receive multiple transmissions from more than one pitcher or uplink facility. Unfortunately, catcher farms are ill-suited to handle conflicts that may arise when providing the received files to a VOD server, and bottlenecks in the flow of data between the catcher farm and the VOD server may arise.

Current catcher systems also fail to provide for meaningful visibility for monitoring the status of a transmission being received by a catcher. As a result, diagnosing the cause of an incomplete or corrupt file often proves difficult.

Consequently, there is a need for systems and methods that allow reception from multiple satellite transmitters in a VOD context using a single catcher/receive unit.

There is also a need for a single catcher/receive unit capable of receiving simultaneous multiple transmissions while also providing content management to manage the flow of data and to diagnose transmission errors.

SUMMARY OF THE INVENTION

The present invention is directed to methods, systems, and devices for simultaneously receiving and processing multimedia asset packages transmitted by a plurality of multimedia content providers.

In one aspect of the present invention, a method to simultaneous receive and process multimedia asset packages from a plurality of multimedia content providers that are transmitted as a plurality of data segments is provided. An identification number is assigned to a frequency band used by each of the multimedia content providers. A plurality of data segments are simultaneously received from the multimedia content providers. Each data segment is tracked using the identification number assigned to the frequency band used by each multimedia content provider. The multimedia asset package transmitted by a multimedia content provider is reconstructed by compiling the plurality of data segments that constitute the multimedia asset package. The reconstructed multimedia asset package is provided to a video-on-demand server, and the server transmits at least a portion of the package to an end user upon demand.

In another aspect of the present invention, a method of simultaneously receiving and processing multiple multimedia asset packages is provided. An identification number is assigned to each of a plurality of frequency bands used by a plurality of multimedia content providers. A plurality of multimedia data segments are simultaneously received from the multimedia content providers. The multimedia data segments are tracked using the identification numbers, and the data segments form a complete multimedia asset package. Accordingly, a complete multimedia asset package is formed using a plurality of multimedia data segments. The complete multimedia asset package is then validated to confirm the successful receipt of the complete multimedia asset. Each complete multimedia asset package is then provided to a video-on-demand server that transmits those assets to end users.

In another aspect of the present invention, a multimedia catcher receiver is provided. The multimedia catcher receiver includes a multimedia network interface unit configured to simultaneously receive a plurality of multimedia data segments sent from a plurality of multimedia content providers. The multimedia network interface unit also provides the multimedia data segments to a receive unit. The multimedia catcher receiver includes a receive unit coupled to the multimedia network interface. The receive unit is configured to reconstruct a complete multimedia asset package using the plurality of multimedia data segments transmitted by a multimedia content provider. The receive unit also validates the complete multimedia asset package received from the multimedia content provider. Additionally, the multimedia catcher receiver includes a content management system configured to receive multimedia asset packages from the receive unit, manage the received multimedia asset packages, and provide the multimedia asset packages to a multimedia server. Each frequency band used by a multimedia content provider is assigned a unique process identification number (PID), and the multimedia catcher receiver tracks the multimedia asset packages using at least the PID assigned to the frequency band used by the multimedia content provider.

These and other objects and features of the present invention will be appreciated upon consideration of the following drawings and description.

BRIEF DESCRIPTION OF THE FIGURES

FIG. 4(d) illustrates an example received transmissions page of the transmissions section of the catcher user interface.

FIG. 4(e) illustrates an asset homepage of an assets section of the catcher user interface.

FIG. 4(f) illustrates an assets results page of the assets section of the catcher user interface.

FIG. 4(g) illustrates an asset summary of an assets details page of the catcher user interface.

FIG. 4(j) illustrates a storage media import menu of a load asset page of the catcher user interface.

FIG. 4(k) illustrates a FTP import menu of the load asset page of the catcher user interface.

DETAILED DESCRIPTION

Figure 1:
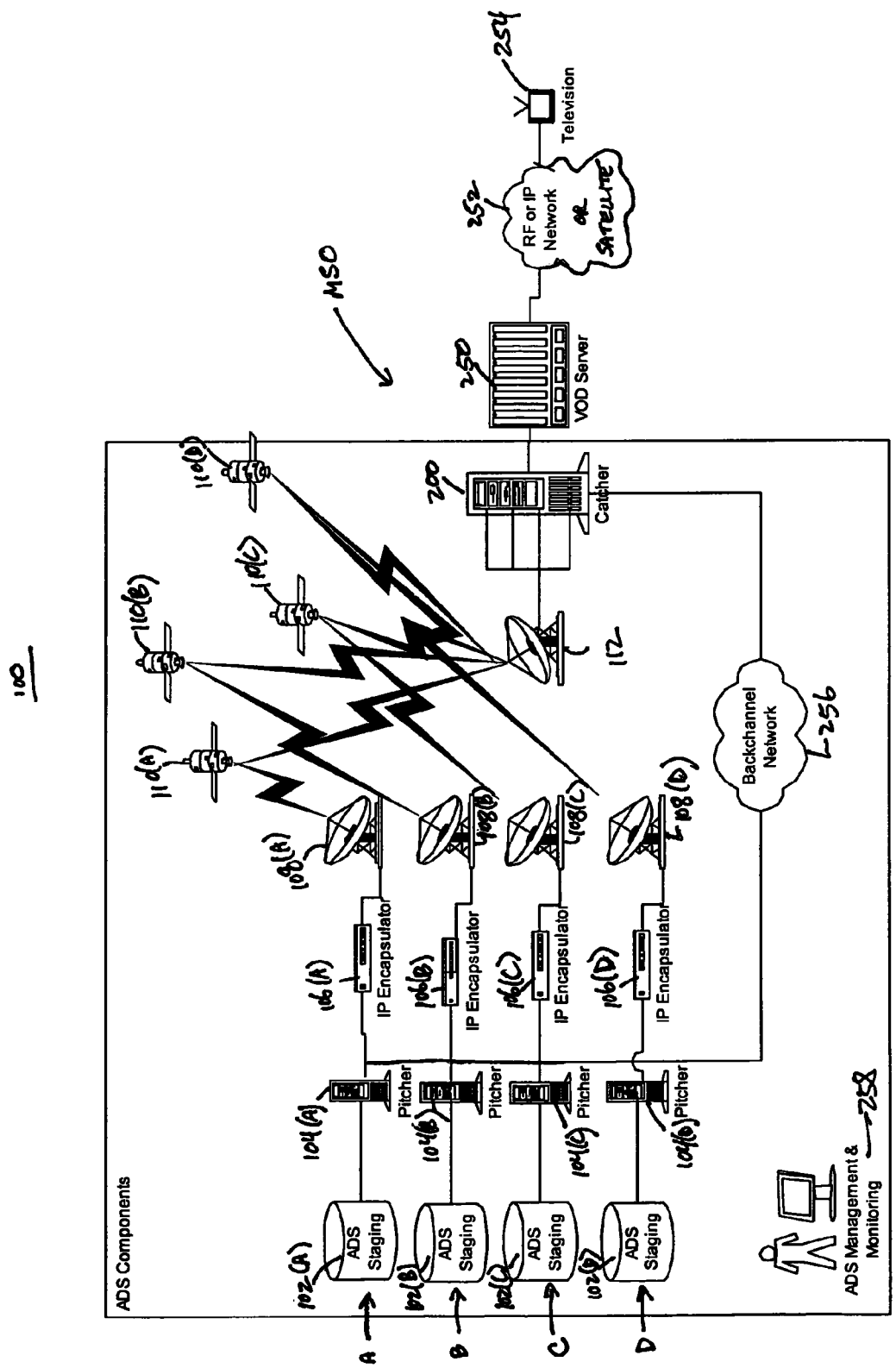
FIG. 1 is a schematic diagram of an asset distribution system that incorporates a multiport catcher and related methods of the present invention.

Preferred embodiments of the systems and methods of the present invention will now be described in detail. Turning first to FIG. 1, a multimedia asset distribution system ("ADS") 100 that implements the multipath/multiport catcher systems and methods of the present invention in a digital video broadcasting environment is illustrated. An ADS system 100 will include a plurality of multimedia content providers, and the ADS system 100 of FIG. 1 is shown with four multimedia content providers identified as A, B, C, and D. One of ordinary skill in the art will appreciate that a greater or smaller number of multimedia content providers may be included in an ADS system 100. Each multimedia content provider A, B, C, and D will have an ADS staging system 102(A) to 102(D), respectively. Each ADS staging system 102(A) to 102(D) is a computer-based system that enables each multimedia content provider A to D to package multimedia content, such as, e.g., movies, with metadata that provides information on the movie, such as, e.g., title, date of theatrical release, summary of plot, cast and crew, Motion Picture Association of America ("MPAA") rating, length, price per view, scheduling information, other XML data desired by a MSO, and the like. For movies, graphics files of movie poster art or box covers may also be included in the multimedia asset package. After a multimedia asset package, which includes, for example, a movie, related metadata, and related art, is compiled by an ADS staging system 102(A) to 102(D), the ADS staging system 102(A) to 102(D) relays the multimedia asset package to a pitcher appliance 104(A) to 104(D), respectively.

The pitcher appliance 104(A) to 104(D) is a hardware and software system that is responsible for initiating and coordinating a transfer of a multimedia asset package to a MSO. The pitcher appliance 104(A) to 104(D) may be implemented using any suitable server, such as, e.g., servers available from Compaq/Hewlett-Packard (Palo Alto, Calif.). The pitcher appliance 104(A) to 104(D) will deconstruct the multimedia asset package into smaller segments in order to expedite the transfer of the multimedia asset package to the MSO. In a preferred embodiment, the pitcher appliance 104(A) to 104(D) augments the multimedia asset package with data that assists in coordinating the transfer of the multimedia asset package. For example, the pitcher appliance 104(A) to 104(D) may append an error tracking code to the multimedia asset package. When a MSO receives the segments of the multimedia asset package, the MSO may analyze the appended error tracking code to reconstruct the complete multimedia asset package from the segments, and to also validate the reconstructed multimedia asset package. To perform the analysis of the error tracking code, reconstruct the multimedia asset package, and validate the reconstructed multimedia asset package, the MSO may use any suitable digital content delivery software, including software available from KenCast, Inc. (Stamford, Conn.).

To facilitate the coordination of the actual transfer of segments to a MSO, Internet Protocol ("IP") encapsulators 106(A) to 106(D) may be utilized. IP encapsulators 106(A) to 106(D) are coupled to pitcher appliances 104(A) to 104(D), respectively. Additionally, IP encapsulators 106(A) to 106(D) are coupled to a satellite uplink facility 108(A) to 108(D), respectively. As a result, an IP encapsulator 106(A) to 106(D) provides a bridge between a pitcher appliance 104(A) to 104(D) and a satellite uplink facility 108(A) to 108(D), respectively. An IP encapsulator 106(A) to 106(D) allows a series of IP packets to tunnel through a satellite transmission, i.e., an IP encapsulator 106(A) to 106(D) converts IP packets into data segments that are streamed via access server integration ("ASI") or other suitable process to a satellite modulator (not shown) that is part of a satellite uplink facility 108(A) to 108(D). The satellite modulator that may be included as part of the satellite uplink facility 108(A) to 108(D) may be any suitable satellite modulator, such as, e.g., modulators available from Radyne ComStream (Phoenix, Ariz.). An IP encapsulator 106(A) to 106(D) may be implemented using any suitable IP encapsulator, such as, e.g., source media routers available from SkyStream Networks (Sunnyvale, Calif.). The satellite uplink facility 108(A) to 108(D) may also include an upconverter, a high power amplifier ("HPA"), and an uplink antenna.

The satellite uplink facilities 108(A) to 108(D) used by the content providers transmit the data segments of the multimedia asset packages to various orbiting satellites 110(A) to 110(D), which in turn transmit the data segments to a satellite downlink facility 112 of a MSO. In one embodiment, the satellite downlink facility 112 may incorporate a 1.0 to 1.8M downlink antenna coupled to a low noise block ("LNB") downconverter.

To implement the systems and methods of the present invention, the MSO will deploy a multiport catcher 200 that is coupled to the MSO's satellite downlink facility 112. The multiport catcher 200 is configured to receive a plurality of transmissions, simultaneously, from multiple content providers. The multiport catcher 200 is a combined hardware and software unit that is configured to reconstruct the data segments sent by the pitcher appliance 104(A) to 104(D) of a content provider A to D into the complete multimedia asset package. Using any suitable digital content delivery software, such as software available from KenCast, Inc. (Stamford, Conn.), the catcher 200 preferably analyzes the error tracking code that is appended to the data segments of the multimedia asset package to reconstruct and validate each package that the catcher 200 receives from a content provider.

In a preferred embodiment, the catcher 200 is a server housed in a one to five rack unit ("RU") rack mountable chassis. Suitable servers include servers available from Compaq/Hewlett-Packard (Palo Alto, Calif.), Dell Computer (Round Rock, Tex.), and IBM (Armonk, N.Y.). In a preferred embodiment, the catcher 200 will include a minimum of 256 MB of random access memory ("RAM"), a plurality of peripheral component interconnect ("PCI") expansion slots to support the integration of a data receiver card (with the catcher 200 having as many PCI slots as the desired number of data receiver cards within the catcher 200), and a plurality of data receiver cards such as DVB compliant L-Band cards capable of receiving DVB satellite transmissions. In one embodiment, universal serial bus ("USB") ports are provided on the catcher 200 and allow for the addition of functionality via external peripherals. Additionally, the catcher 200 includes at least 120 GB of storage capacity. For robustness and reliability, the storage may be allocated across a redundant array of inexpensive disks ("RAID" array), and to minimize cost IDE storage technology may be utilized. Furthermore, the catcher 200 may incorporate a form of out-of-band management that would allow for dial-up access, cold start-up, or manual rebooting of the catcher 200 if necessary.

In addition to satellite transmissions, the catcher 200 is preferably also able to receive multimedia asset packages locally using physical media, a local network, or a terrestrial-based network. Accordingly, the catcher 200 may incorporate a digital versatile disc ("DVD") based drive or other suitable local data drive. The catcher 200 may alternatively or additionally be coupled to a file transfer protocol ("FTP") server to obtain multimedia asset packages from the FTP server. The catcher 200 may further include a removable disk drive to allow for local exchange of data via removable disks.

The catcher 200 also preferably acknowledges to the content provider, or the uplink facility managing the transmission from the content provider, a successful or failed transmission. In the event of a failed transmission the catcher 200 requests a complete or partial retransmission of the multimedia asset package. In one embodiment, to accomplish the acknowledge function the catcher 200 is operably coupled to content providers A to D via a backchannel network 256, and the catcher 200 utilizes the backchannel network 256 to provide acknowledgements or to request retransmissions of data packets to the content providers A to D. The backchannel network 256 may be any suitable communications network, such as, e.g., an internet-based network, a public switched telephone network ("PSTN"), a corporate virtual private network ("VPN") and the like. The catcher 200 end of the backchannel network 256 is preferably implemented via a network interface ("NIC") card that enables the catcher 200 to utilize 10/100 ethernet, or a similar high speed network connection. Alternatively, the catcher 200 may use a standard modem to connect to the backchannel network 256.

In a preferred embodiment, to properly receive and process multiple data transmissions from different content providers on a simultaneous basis, the catcher 200 incorporates a plurality of data receiver cards. The data receiver cards may be, e.g., satellite NIC cards or, more particularly, L-Band satellite receiver cards. Any suitable satellite NIC cards or receiver cards may be incorporated within the catcher 200, including satellite receiver cards available from BroadLogic Network Technologies (San Jose, Calif.) and Optibase, Inc. (Mountain View, Calif.). References herein to data receiver cards are intended to encompass both satellite NIC cards and satellite receiver cards. The number of data receiver cards implemented within the catcher 200 will determine the number of different transmissions that the catcher 200 may receive simultaneously. For example, a catcher 200 that incorporates four data receiver cards will be capable of receiving four simultaneous transmissions from four different content providers. Preferably, the catcher 200 will incorporate at least three data receiver cards.

Figure 2:
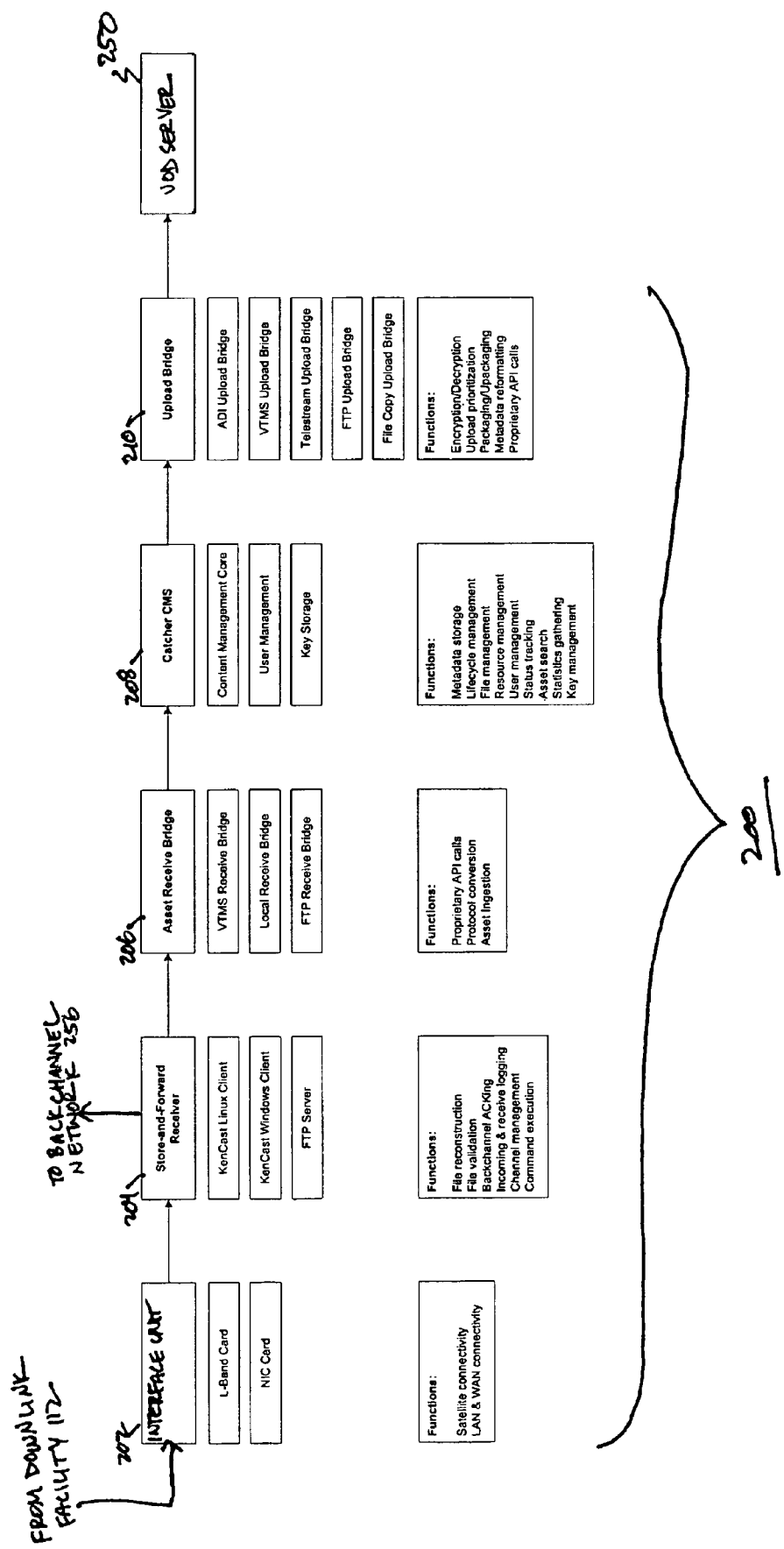
FIG. 2 is a schematic diagram of components of a multiport catcher of the present invention.

Turning to FIG. 2, a schematic view of the functional components of the catcher 200 that receive and process the simultaneous multiple transmissions is illustrated. A multimedia content provider interface unit 202 of the catcher 200 provides physical connectivity to content providers. The interface unit 202 is configured to receive signals transmitted to the downlink facility 112 by content providers. The interface unit 202 includes at least the data receiver cards of the catcher 200, and may optionally incorporate a NIC card. In one embodiment, the data receiver cards of the interface unit 202 are configured to receive transmissions on different downlink frequencies. In another embodiment, the interface unit 202 is configured to receive transmissions from content providers via the downlink facility 112 on a common downlink frequency.

As previously noted, the data receiver cards of the catcher 200 may be DVB compliant L-Band cards. Additionally, if included, the NIC card provides access to terrestrial-based networks in addition to satellite transmissions. To enable the reception of simultaneous, multiple transmissions from content providers, a plurality of data receiver cards is provided, with a data receiver card for each content provider. (For terrestrial-based networks, a single NIC card may receive multiple transmissions from multiple content providers). In one embodiment, to differentiate between different content providers each content provider transmits on a different frequency band, each different frequency band is assigned a unique process identification number ("PID"), and each content provider includes the PID assigned to the frequency band it uses for its transmissions along with each transmission of a multimedia asset package or a segment of a multimedia asset package. The catcher 200 analyzes the PID included with each transmission to identify the frequency band, and therefore identify the content provider that originated the transmission. For example, in an embodiment of the catcher 200 that incorporates three data receiver cards in the interface unit 202, a first frequency band may be assigned a PID of 256 (decimal) or 100 (hex), a second frequency band may be assigned a PID of 512 (decimal) or 200 (hex), and a third frequency band may be assigned a PID of 768 (decimal) or 300 (hex). Correspondingly, the interface unit 202 will include a first data receiver card tuned to receive transmissions that include a PID of 256 (decimal) or 100 (hex), a second data receiver card tuned to receive transmissions that include a PID of 512 (decimal) or 200 (hex), and a third data receiver card tuned to receive transmissions that include a PID of 768 (decimal) or 300 (hex). In this embodiment, the catcher 200 is configured to simultaneously receive transmissions from three different content providers (each of whom are using a different frequency band) using three data receiver cards, and the interface unit 202 of the catcher 200 will discriminate each transmission based upon the associated PID.

Figure 3:
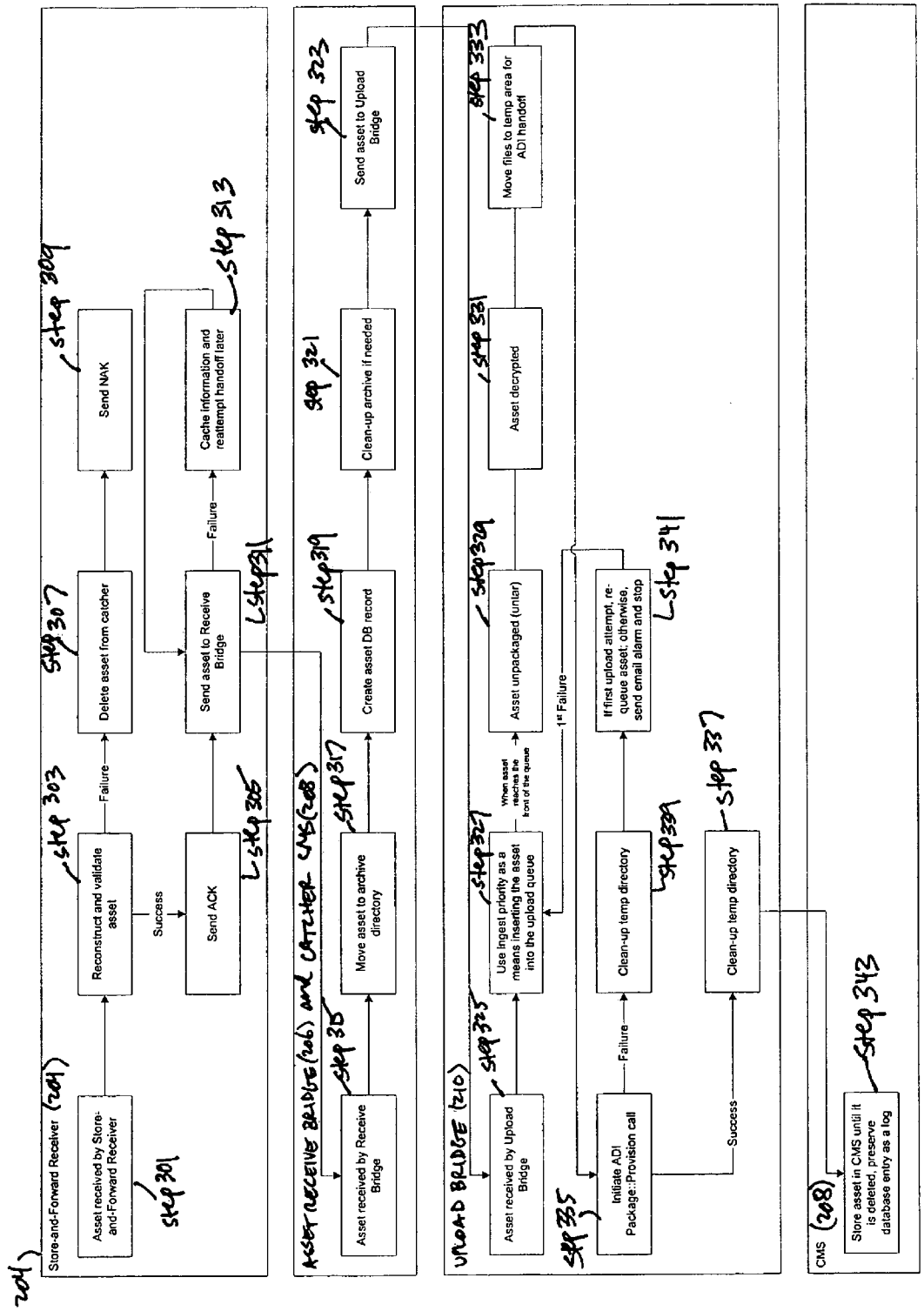
FIG. 3 is a flow diagram of functions performed by a multiport catcher of the present invention.

After receiving a data packet from the downlink facility 112, the interface unit 202, and specifically the data receiver cards, relays the data packet to a store-and-forward receiver unit 204. The store-and-forward receiver unit 204 may be a computer operating any suitable content delivery program, such as, e.g., the digital content delivery software available from KenCast, Inc. (Stamford, Conn.). FIG. 3 illustrates a flow diagram of the functions performed by the store-and-forward receiver unit 204, as well as other components of the catcher 200. Referring to both FIGS. 2 and 3, with references to FIG. 3 being referred to as "Steps," the store-and-forward receiver unit 204 receives the segments of a multimedia asset package from the interface unit 202 of the catcher 200. (Step 301). Using the segments of the assets, the store-and-forward receiver unit 204 reconstructs the complete multimedia asset package. (Step 303). The store-and-forward receiver unit 204 also validates the reconstructed multimedia asset package by examining the appended error tracking code to determine whether the asset was successfully received, and communicates back to the pitcher 104(A) to (D) or uplink facility 108(A) to (D), since multiple content providers may use the same uplink facility, whether the asset transmission and receipt was successful. (Step 303). Accordingly, the store-and-forward unit 204 may be coupled to the backchannel network 256. Using the backchannel network 256, if a particular transmission was not successfully received, the store-and-forward receiver unit 204 may delete the unsuccessfully received asset from the catcher (Step 307), but, in any event, will send a message to the content provider notifying the provider of the unsuccessful transmission (Step 309). The catcher 200 may then request a retransmission of all or part of the multimedia asset package from the content provider. Alternatively, if the store-and-forward receiver unit 204 is not coupled to the backchannel network 256, the store-and-forward receiver unit 204 is accessible via an internet or other network connection. Here, a content provider may communicate with the catcher 200 to retrieve status updates regarding its transmissions (or the MSO may periodically or upon request send updates to the content provider). If a transmission was successful, the store-and-forward receiver unit 204 acknowledges back to the pitcher 104(A) to (D) or uplink facility 108(A) to (D) that the transmission was properly received. (Step 305). The store-and-forward receiver unit 204 then relays the multimedia asset package to an asset receiver bridge 206 for further processing. (Step 311). If the relay of the multimedia asset package to the asset receiver bridge 206 is initially unsuccessful, the store-and-receiver unit 204 may cache the multimedia asset package and reattempt a hand-off of the multimedia asset package to the asset receiver bridge 206 at a later time. (Step 313). The store-and-forward receiver unit 204 additionally logs incoming and received multimedia asset packages to track the progress and history of multimedia asset packages received by the catcher 200.

The catcher 200 further includes an asset receiver bridge 206 in communication with the store-and-forward receiver unit 204 and also in communication with a catcher content management system ("CMS") 208. The asset receiver bridge 206 is designed to load multimedia asset packages, irrespective of format or manner of reception/ingest, into the catcher CMS 208 and to process those asset packages using the catcher CMS 208. The catcher CMS 208, in turn, stores and manages the information that is delivered to the catcher 200. To process multimedia asset packages transmitted or uploaded via a variety of sources, the asset receiver bridge 206 may incorporate a subsystem to process multimedia asset packages received by satellite, a subsystem to process multimedia asset packages loaded locally, such as, e.g., via a DVD-based drive, and a subsystem to process multimedia asset packages received via a FTP server or other network connection. After the asset receiver bridge 206 receives a multimedia asset package (Step 315), the asset receiver bridge 206 utilizes the catcher CMS 208 to transfer the multimedia asset package to an archive directory associated with an asset database (Step 317). The asset receiver bridge 206 then utilizes the catcher CMS 208 to create an asset database record to identify the multimedia asset package within the database. (Step 319). Additionally, if necessary, the asset receiver bridge 206 may instruct the catcher CMS 208 to periodically clear the asset database of any unneeded asset database records to increase the performance of the catcher 200 by eliminating unnecessary or untimely data from the database. (Step 321). After indexing the multimedia asset package in the asset database, the catcher CMS 208 then hands the multimedia asset package over to an upload bridge unit 210. (Step 323).

While the multimedia asset package is processed by the catcher 200, the asset package is assigned one of four status labels that describes the state of the multimedia asset package relative to the overall asset package processing cycle. Prior to being handed off from the catcher CMS 208 to the upload bridge unit 210, a multimedia asset package is assigned a "Pending" status, which identifies the multimedia asset package as having been received by the catcher CMS 208 but awaiting entry into an upload queue.

After receiving a multimedia asset package from the catcher CMS 208 (Step 325), the upload bridge unit 210 of the catcher 200 inserts the multimedia asset package into an upload queue (Step 327). The upload bridge unit 210 is capable of supporting a variety of handoff protocols, queuing mechanisms, and content types. In one embodiment, the upload bridge unit 210 inserts the multimedia asset package into the upload queue based upon a first-in-first-out ("FIFO") priority scheme. In other embodiments, the upload bridge unit 210 inserts the multimedia asset package into the upload queue in an order that is determined by certain characteristics of the assets in the package, such as, e.g., genre of movie, length of movie file, originating content provider, and the like. In all embodiments, the upload bridge unit 210 allows a user to manually determine the order of the multimedia asset packages in the upload queue, rearrange the order of the multimedia asset packages in the upload queue, or even remove multimedia asset packages in the upload queue. After the multimedia asset package has been inserted into the upload queue, the status of the multimedia asset package is changed to "Queued." An application suitable for use in manipulating the multimedia asset packages will be described herein.

The catcher 200 uploads the multimedia asset package to a VOD server 250 based upon the order in which the multimedia asset package is placed into the upload queue. When a multimedia asset package arrives at the front of the upload queue, the catcher 200 implements an asset distribution protocol of the upload bridge unit 210 to move multimedia asset packages between the catcher 200 and the VOD server 250. One example protocol that may be implemented with the upload bridge unit 210 is an asset distribution interface available from the CableLabs consortium (Louisville, Colo.). In a preferred embodiment, the asset distribution protocol is implemented in Java in order to maximize the ability to customize the protocol for future enhancements. Regardless of the actual program used, the upload bridge unit 210 utilizes the asset distribution protocol to first unpackage (or "untar" if the multimedia asset package is packaged as a tar file) the multimedia asset package to expose its individual asset files, such as, e.g., a movie MPEG file, a preview MPEG file, a box cover graphic file, a XML file, and the like. (Step 329). The upload bridge unit 210 preferably incorporates a plurality of asset distribution protocol components customized to process a particular asset type or process uploads for particular upload destinations. The upload bridge unit 210 then decrypts the movie file (Step 331), and moves the individual files to a temporary directory for subsequent transfer to a VOD server 250 or other external system (Step 333).

Next, the upload bridge unit 210 initiates a provision call to the VOD server 250 to notify the VOD server 250 that the asset files of a multimedia asset package is ready for transfer. The upload bridge unit 210 subsequently transfers the unpackaged and decrypted asset files to the VOD server 250 of the MSO. (Step 335). While the assets are in the process of being transferred to the VOD server 250, the status of the multimedia asset package is changed to "Loading." When the unpackaged and decrypted asset files are successfully uploaded/transferred to the VOD server 250, the upload bridge 210 removes the unpackaged asset files from the temporary directory (Step 337) and the upload bridge 210 updates the status of the multimedia asset package to "Uploaded." If, however, the upload attempt to the VOD server 250 fails, the upload bridge 210 removes the asset files from the temporary directory (Step 339), reenters the multimedia asset package into the upload queue, and attempts another upload if only a single upload attempt has been made (Step 341). If more than one upload attempt has already been made, and the upload attempts are still unsuccessful, the upload bridge 210 assigns the multimedia asset package a status of "Pending" and triggers an email alert regarding the failed upload to be sent to an ADS management interface 258.

After a multimedia asset package is uploaded to the VOD server 250 or other external system, the catcher 200 deletes the multimedia asset package from the catcher CMS 208. (Step 343). In one preferred embodiment, the deletion operation removes the multimedia asset package's associated files from the catcher 200, but does not remove the multimedia asset package's metadata. Instead, the metadata is assigned a "Deleted" status and remains in the catcher CMS 208 until it is removed through periodic database pruning.

As previously noted the catcher 200 preferably incorporates a user interface or application 400 to enable the MSO to view information regarding, and to manipulate the processing of, multimedia asset packages queued by the catcher 200 and waiting for upload to a VOD server 250. Using the catcher user interface 400, the MSO will be able to remove any multimedia asset package from the queue, reorder the multimedia asset packages in the queue, and delete a multimedia asset package that has already been successfully uploaded. The catcher user interface 400 will also enable the MSO to manually force the upload of a multimedia asset package to a VOD server 250 irrespective of the position of the package in the upload queue of the catcher 200, thereby enabling a "pull"-based information exchange as an alternative to the FIFO, "push"-based exchange that is the default for the catcher 200 to transfer multimedia asset packages to the VOD server 250. Similarly, the catcher user interface 400 will allow the MSO to initiate a local upload of a multimedia asset package via, e.g., a DVD or FTP transfer.

Figure 4:
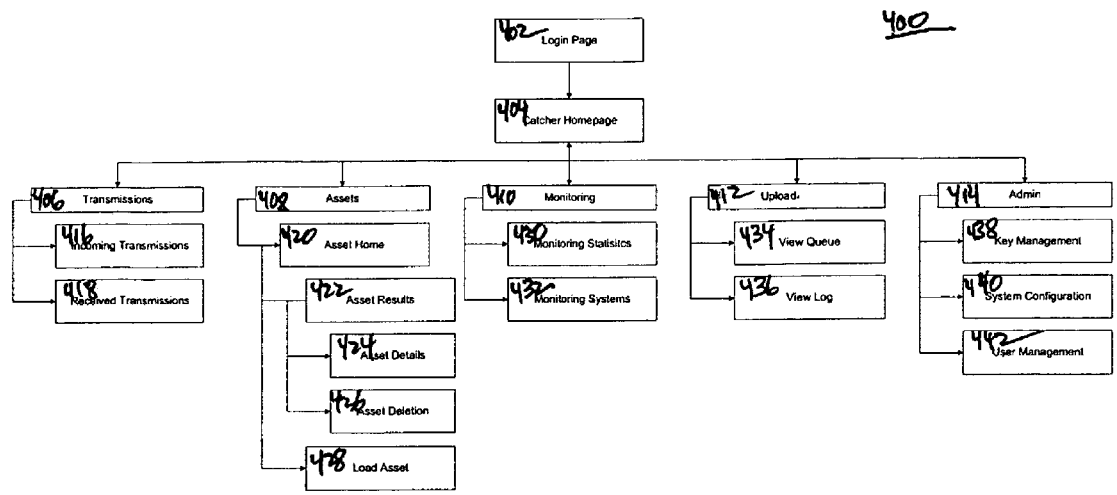
FIG. 4 is a diagram of one embodiment of a catcher user interface of the present invention.
Figure 4A:
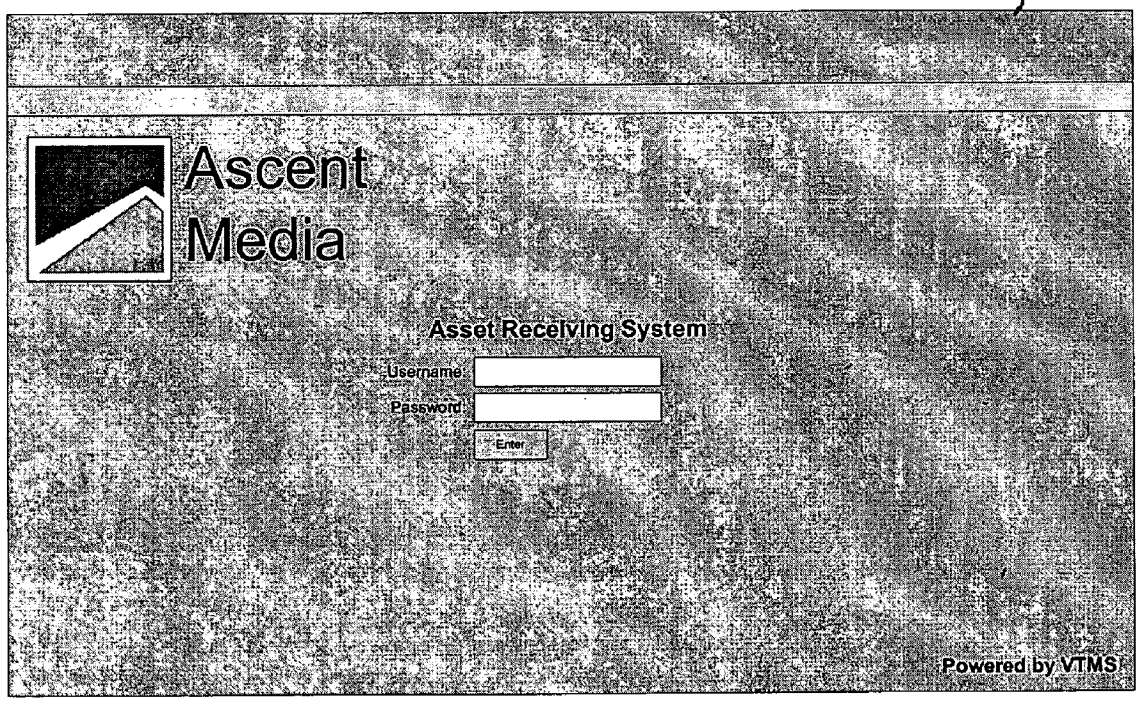
FIG. 4(a) illustrates an example login page of the catcher user interface.
Figures 4B, 4C:
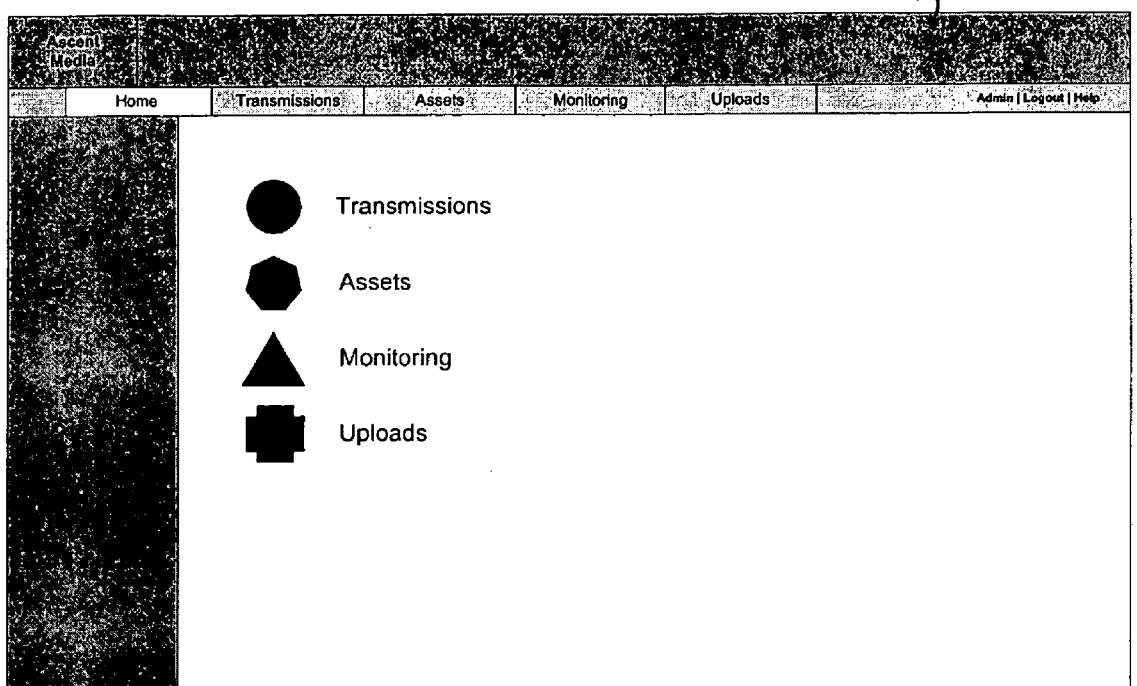
FIG. 4(b) illustrates an example homepage of the catcher user interface.
FIG. 4(c) illustrates an example incoming transmissions page of a transmissions section of the catcher user interface.

Turning to FIG. 4, a diagram depicting the screens or pages for one embodiment of the catcher user interface 400 is illustrated. The catcher user interface 400 includes a login page 402 that exposes a standard login control having user name and password textboxes. An example log-in page 402 is shown in FIG. 4(a). After an authorized user name and password are entered in the user name and password textboxes of the log-in page 402, the user is shown the catcher homepage 404. An example catcher homepage 404 is illustrated in FIG. 4(b). The main purpose of the homepage 404 is to direct a user into one of the interface's 400 other sections, including a transmissions 406 (monitoring of incoming transmissions and reviewing previous transmissions), assets 408 (browsing and manipulation of assets staged on the catcher 200), monitoring 410 (monitoring status of catcher 200 resources), upload 412 (viewing progress of packages that have been sent to the upload bridge for uploading into VOD server 250), and administration 414 section.

Figures 4D, 4E:
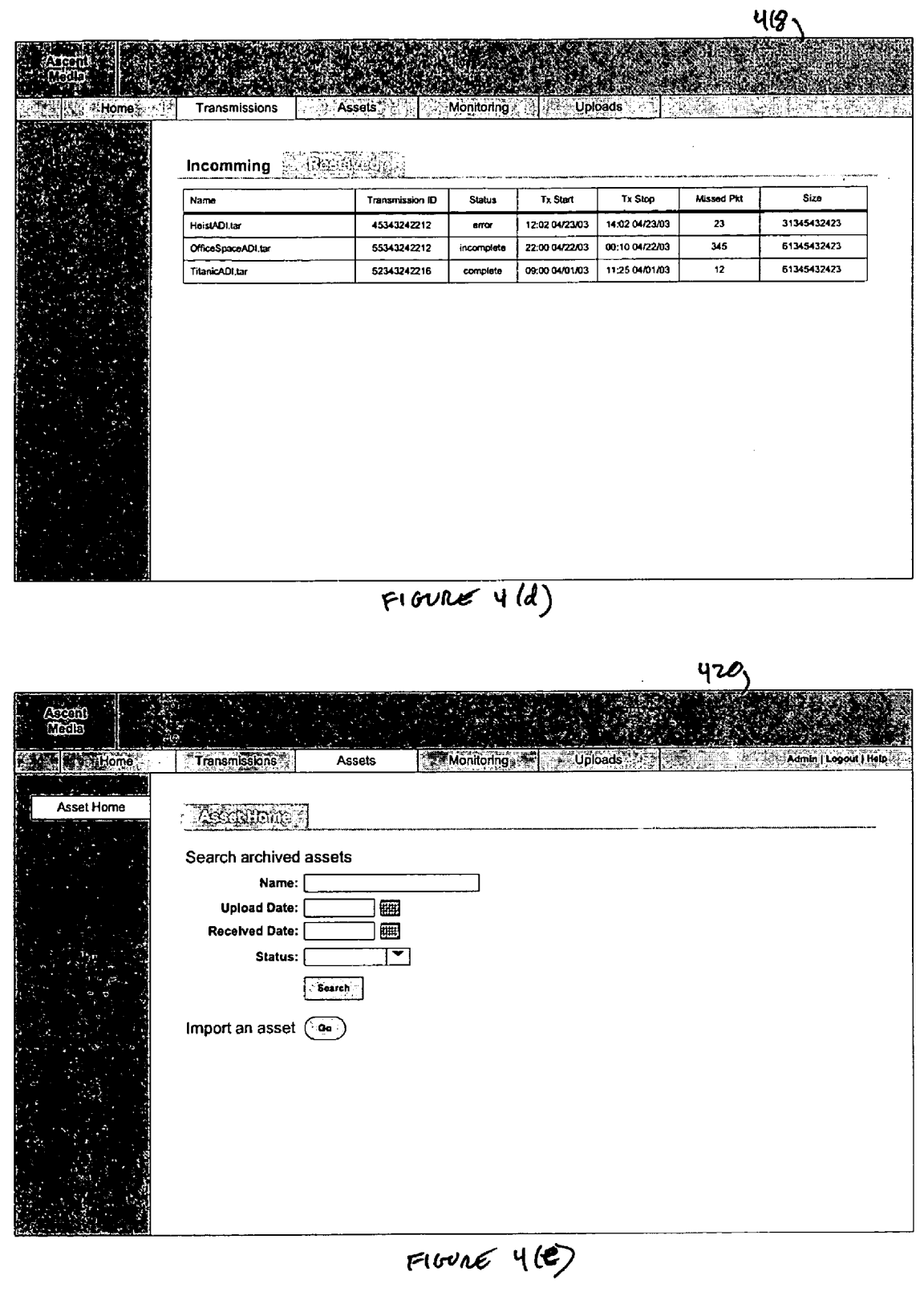

The transmissions section 406, example pages of which are shown in FIGS. 4(c) and 4(d), is used to report information about the content delivery program utilized by the catcher 200, including the status of incoming (active) transmissions and the status of received (past) transmissions. A user may alternate between an incoming transmissions page 416 and received transmissions page 418. FIG. 4(c) illustrates the incoming transmissions page 416 presented by the transmissions section 406. Here, the incoming transmissions page 416 is presented in tabular or grid form, and contains at least the following data: the name of the incoming file, a transmission identification associated with the incoming file, a channel used by the transmission, the status of the transmission (e.g., "active," "closing," "suspended," "incoming," and the like), the progress of the transmission/percentage of the transmission that is complete, the number of bytes currently transmitted, and the total number of bytes for the complete transmission. FIG. 4(d) illustrates the received transmissions page 418 accessible using the transmissions section 406. Like the incoming transmissions page 416, the received transmissions page 418 is preferably presented in tabular or grid form. The received transmissions page 418 includes at least the following data: the name of the file, the transmission identification number associated with the file, the status/outcome of the transmission (possible values include "error," "incomplete," "complete," "validated," "duplicate," and "newer file"), the transmission start time, the transmission stop time, the number of missing packets if any, and the size/number of bytes delivered.

The assets section 408 of the catcher interface 400 enables a user to browse and manipulate asset packages that have been staged on the catcher 200. An asset homepage 420, an example of which is shown in FIG. 4(e), is first displayed when a user accesses the assets section 408. The asset homepage 420 provides a user with two paths by which to view the asset packages: a search interface, and a link to a load asset page 428. The search interface allows a user to construct a search of the asset packages using multiple "AND" conditions. Possible search terms/conditions available to the user include: name (allows user to enter the name of a received asset package), upload-date (allows user to specify the date an asset package was uploaded to an external system/VOD server 250), received date (allows user to specify the date an asset package was received by the catcher 200), and status (allows user to specify the status of an asset package).

After a search is entered, an asset results page 422, an example of which is shown in FIG. 4(f), displays the results of the search. The asset results page 422 may include the following information, preferably presented in tabular or grid form: name (the name of the multimedia asset package, which may be hyperlinked to an asset details page 424 for the package), received date (the date the multimedia asset package was received by the catcher 200), and status (the status associated with the multimedia asset package). The asset results page 422 will also include commands available to the user to manually send a multimedia asset package to the upload bridge unit 210 of the catcher 200 for subsequent upload to a VOD server 250, and to delete a multimedia asset package.

Figure 4H:
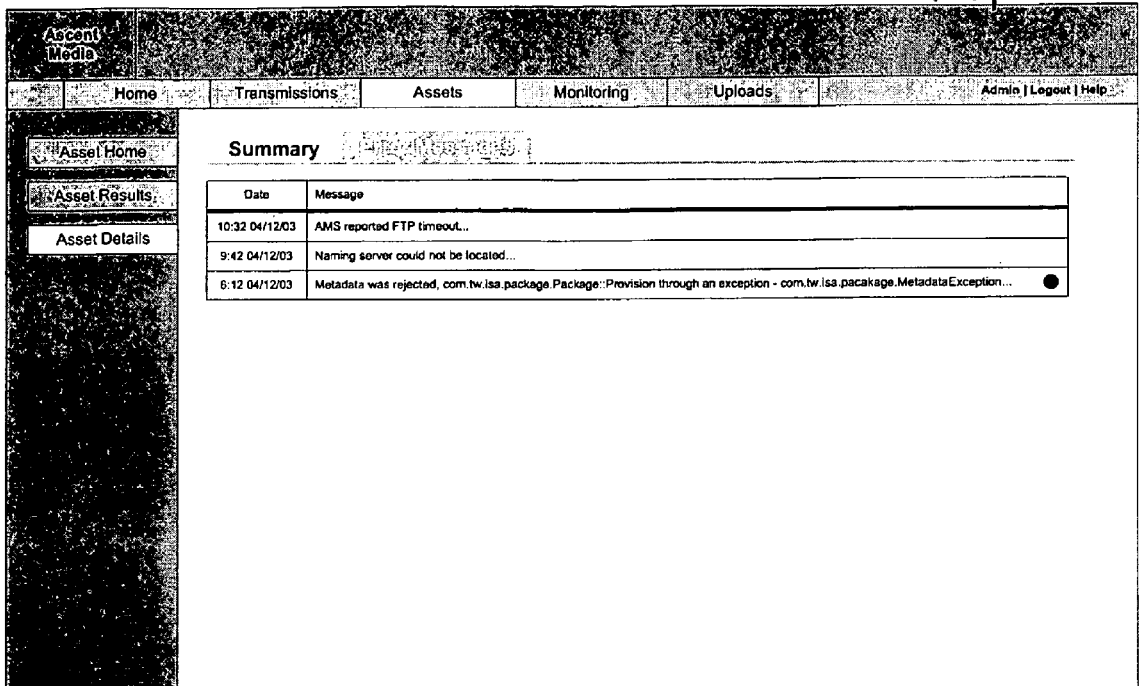
FIG. 4(h) illustrates an errors summary of the assets details page of the catcher user interface.

The asset details page 424, example pages of which are shown in FIGS. 4(g) and 4(h), displays information regarding a multimedia asset package. The asset details page 424 has two categories, an asset summary 424(a) shown in FIG. 4(g) and an errors summary 424(b) shown in FIG. 4(h). The asset summary 424(a) displays asset metadata, including the name of the multimedia asset package, the asset type (e.g., ADI package, VTMS asset, streaming asset, AMX asset), the description of the multimedia asset package, the status of the multimedia asset package, the ingestion priority, the number of upload attempts, the origin (e.g., satellite, DVD, FTP, and the like), the owner, the date received, the date uploaded, and the date deleted. The errors summary 424(b), shown in FIG. 4(h), lists any upload error messages associated with a multimedia asset package.

Figure 4I:
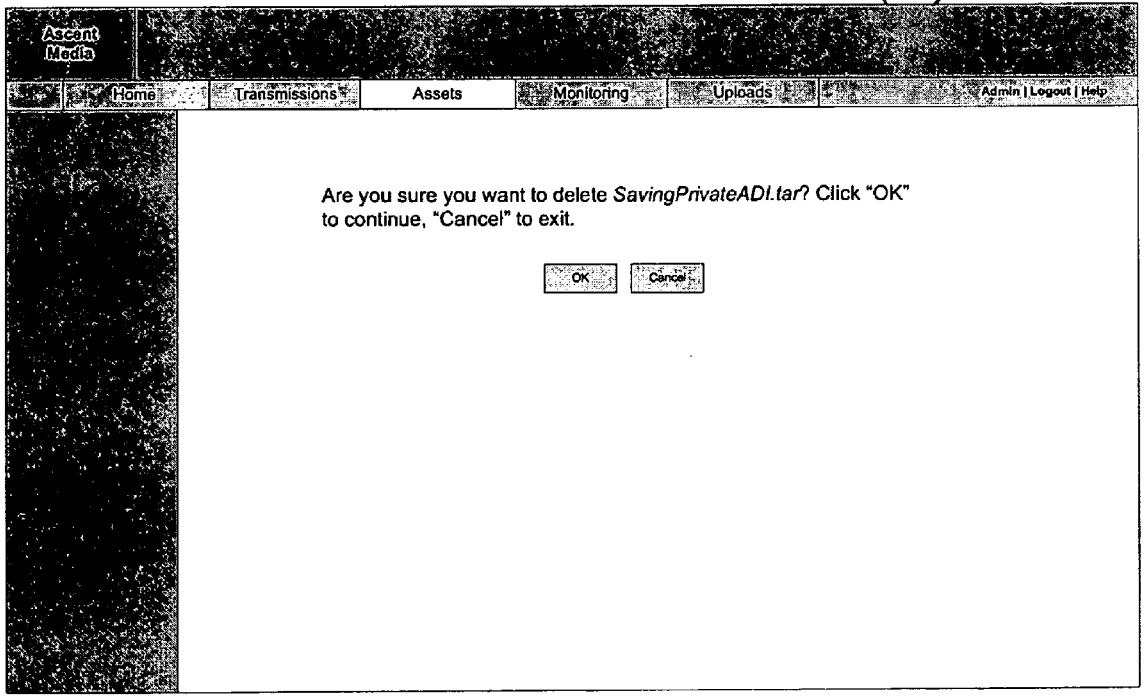
FIG. 4(i) illustrates an asset deletion confirmation page of the catcher user interface.

If the user employs the catcher interface 400 to manually delete a multimedia asset package, the catcher interface 400 presents an asset deletion confirmation page 426, an example of which is shown in FIG. 4(i), to the user. The asset deletion confirmation page 426 indicates the name of the asset package chosen for deletion and asks the user to confirm the deletion. The user is then returned to the asset results page 422.

Figures 4J, 4K:
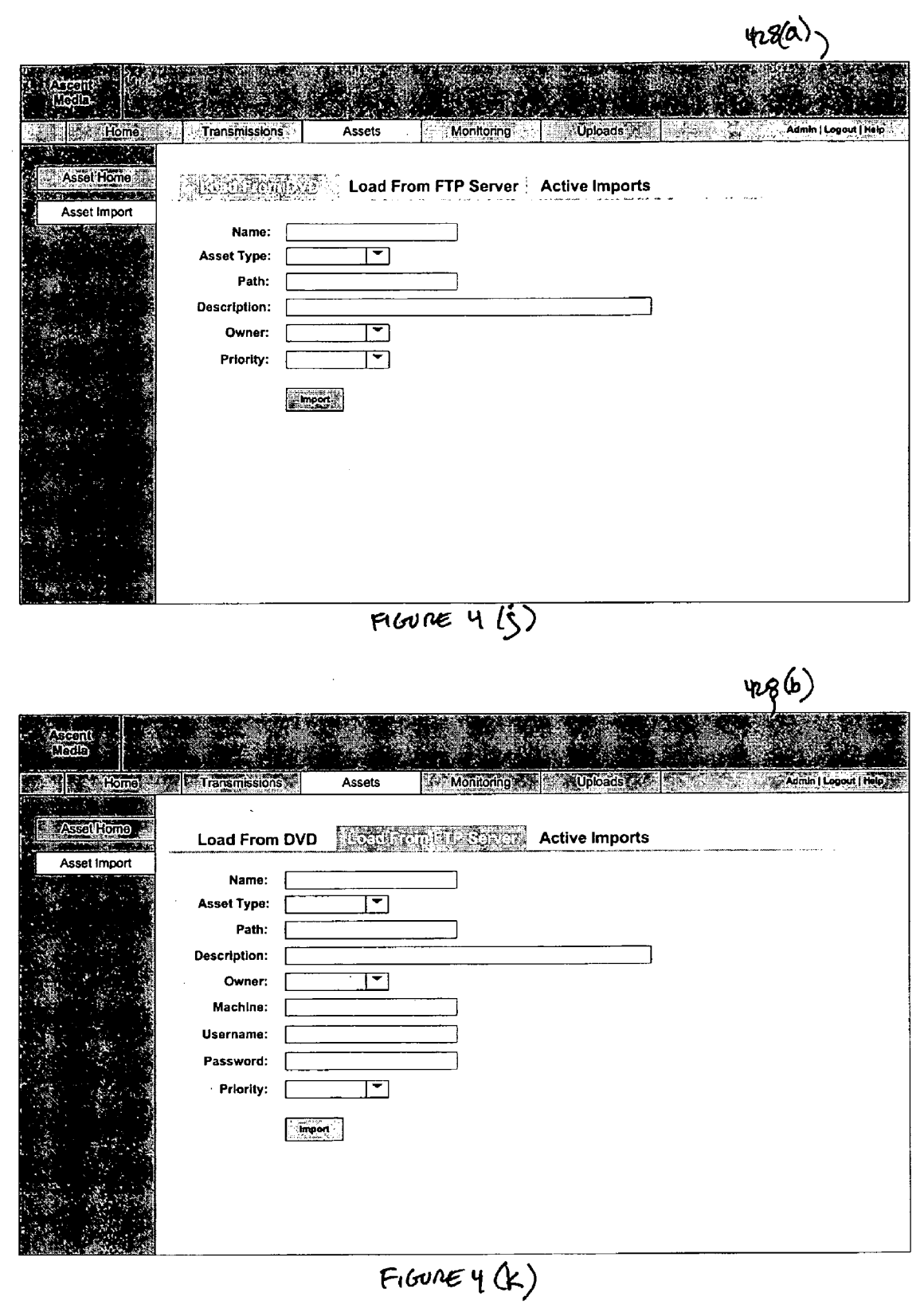

The assets section 408 of the catcher interface 400 also includes a load asset page 428 that allows a user to manually upload a multimedia asset package to a VOD server 250. In one embodiment, the load asset page 428 allows at least two upload procedures. One upload procedure enables a user to import a multimedia asset package from storage media, such as, e.g., a DVD. Another upload procedure enables a user to import a multimedia asset package from a FTP server. The progress of either importation method may also be monitored using the load asset page 428. FIG. 4(j) illustrates an example storage media import menu 428(a) of the load asset page 428. To specify the multimedia asset package that is being loaded/imported from storage media such as a DVD, the storage media import menu 428(a) enables a user to provide the file name of the asset package, the asset type (e.g. ADI package, or the like), the path to the multimedia asset package on the storage media, the description of the multimedia asset package, the owner, and an ingest priority. After submitting this information, the catcher 200 will attempt to load the multimedia asset package, and the catcher interface 400 will either display a success or an errors message depending on the success of the import operation. FIG. 4(k) illustrates an example FTP import menu 428(b) of the load asset page 428. As with the storage media import media, the FTP import menu 428(b) enables a user to identify the multimedia asset package that is desired to be imported from a FTP server. The information that a user may provide via the FTP import menu 428(b) includes the name of the multimedia asset package, the asset type, the path, the description, the owner, the server/machine on which the multimedia asset package is located (e.g., IP address, host name of the FTP server, and the like), the username needed to access the FTP account, the password needed to access the FTP account, and an ingest priority. As with the storage media import process, the catcher interface 400 will either display a success or an error message depending on the ability of the catcher 200 to import the multimedia asset package from the FTP server.

Figure 4L:
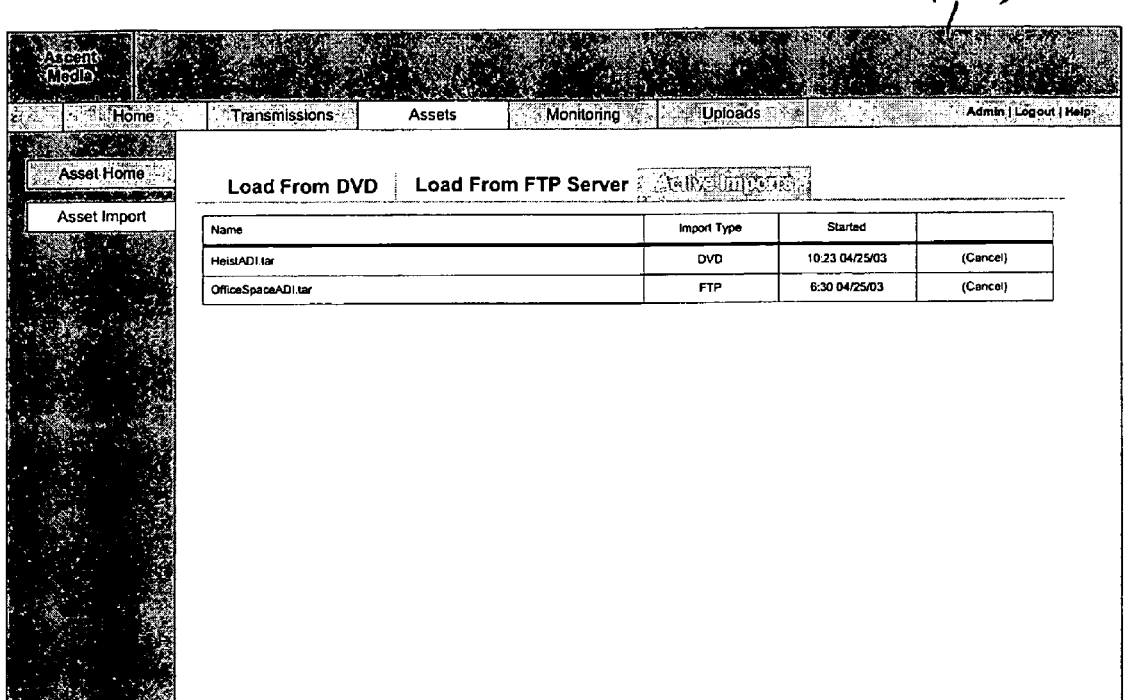
FIG. 4(l) illustrates a monitoring menu of the load asset page of the catcher user interface.

The load asset page 428 also enables a user to monitor the progress of multimedia asset package imports, as illustrated in the monitoring menu 428(c) shown in FIG. 4(l). The monitoring menu 428(c) of the load asset page 428 will provide at least the following information in order to allow a user to monitor the progress of an import: the name of the multimedia asset package, the import type (e.g., DVD or FTP), and the date and time the import was initiated. On the monitoring menu 428(c), the user will be provided an option to cancel any particular import job.

Figure 4M:
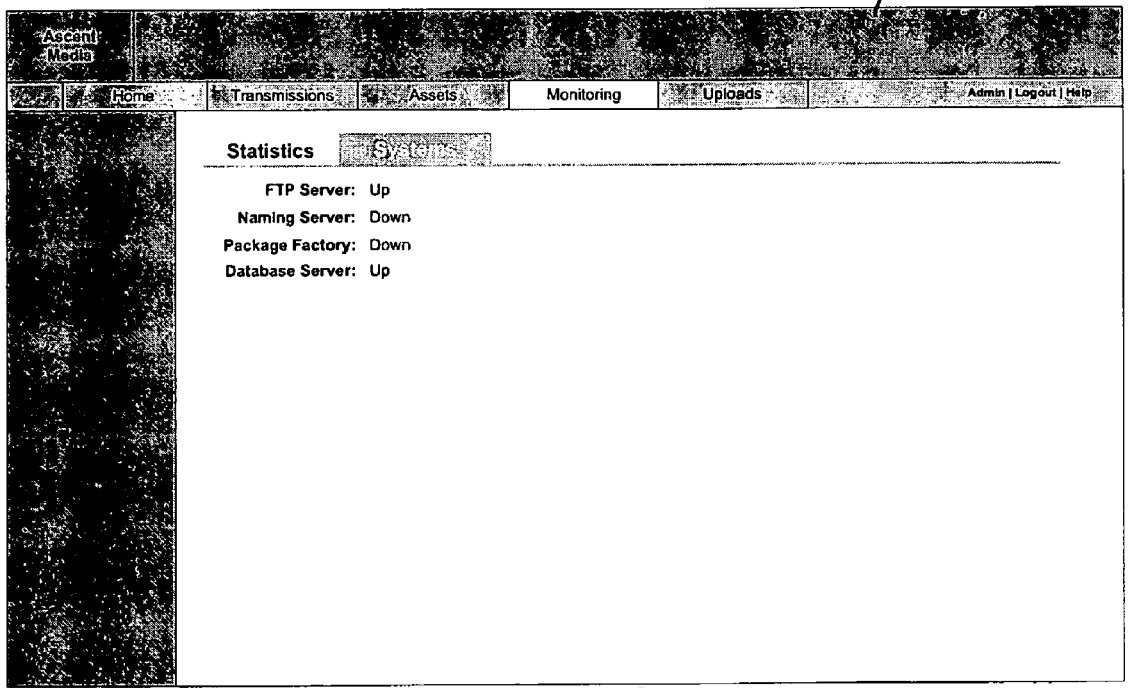
FIG. 4(m) illustrates a monitoring systems page of a monitoring section of the catcher user interface.

The catcher interface 400 also incorporates a monitoring section 410 that provides information regarding catcher 200 statistics. The monitoring section 410 is preferably divided into two sub-parts, a monitoring statistics page 430 and a monitoring systems page 432. Turning to FIG. 4(m), one embodiment of the monitoring systems page 432 is shown. The monitoring systems page preferably indicates whether various subsystems of the catcher 200 and systems operating with the catcher 200 are properly operating, including, e.g., a FTP server, a naming server, a package factory, a database server, and the like. For example, to determine the health of the FTP server, the catcher 200 should connect to the server and run an "ls" command that provides the catcher 200 with the health information for the FTP server. To determine the health of its local naming service, the catcher 200 should request a package factory instance. To determine the health of the package factory, the catcher 200 should request a new package.

Figures 4N, 4O:
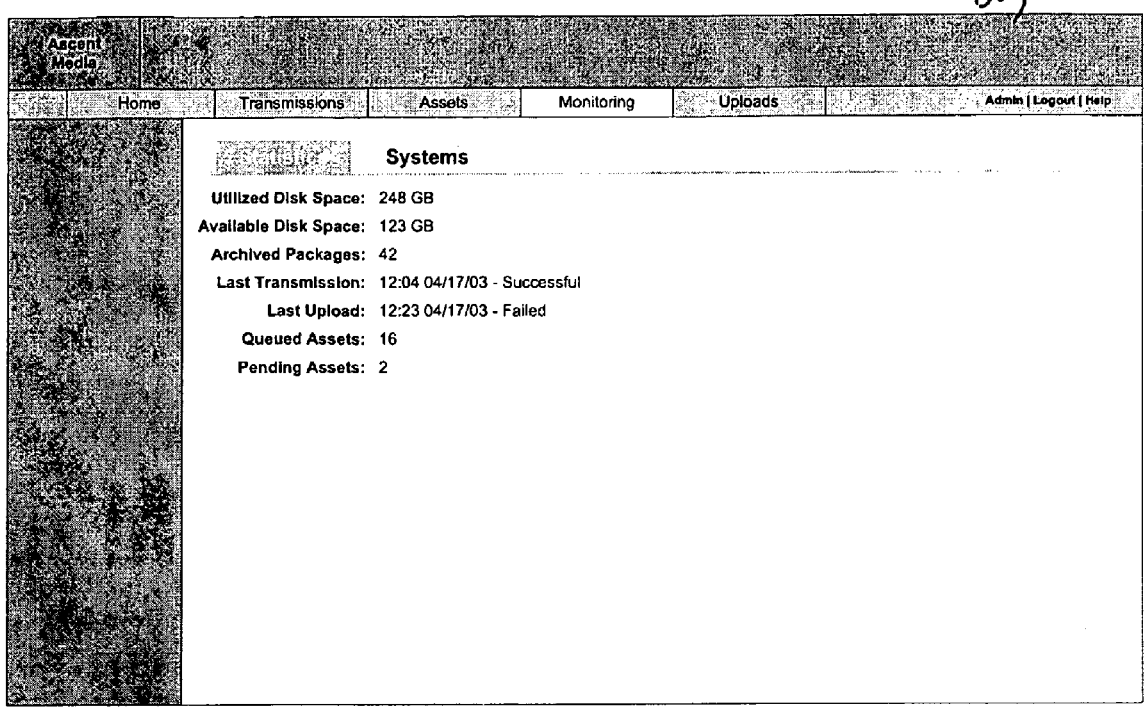
FIG. 4(n) illustrates a monitoring statistics page of the monitoring section of the catcher user interface.
FIG. 4(o) illustrates an upload queue menu of an upload section of the catcher user interface.

FIG. 4(n) shows one embodiment of the monitoring statistics page 430 of the monitoring section 410. The monitoring statistics page 430 is used to report a variety of catcher 200 related statistics, including utilized disk space on the catcher 200, available disk space on the catcher 200, the number of archived packages on the catcher 200, the date and time of the last received transmission (and the status of that transmission), the date and time of the last upload (and the status of that upload), the number of multimedia asset packages currently entered in the upload queue, and the number of multimedia asset packages awaiting upload and are not in the upload queue.

The catcher interface 400 additionally includes an upload section 412 that displays information about the multimedia asset packages that are queued for delivery to an external system/VOD server 250 as well as information regarding past uploads. The upload section 412 includes an upload queue menu 434 and an upload log menu 436. An example upload queue menu 434 is shown in FIG. 4(o). The upload queue menu 434 preferably displays in grid or tabular form the multimedia asset packages that are queued for upload to a VOD server 250. The information presented by the upload queue menu 434 includes the entry of the asset package (i.e., the position of the multimedia asset package in the upload queue), the name of the queued multimedia asset package, the date the multimedia asset package was received by the catcher 200, the number of attempts the catcher 200 has made to upload the multimedia asset package to the VOD server 250, and the ingest priority of the multimedia asset package. The upload queue menu 434 also enables a user to manipulate queued multimedia asset packages by moving an asset package forward in the queue, backwards in the queue, and removing the asset package from the queue entirely. The user may not, however manipulated a queued multimedia asset package that is in the process of being uploaded to a VOD server 250.

Figure 4P:
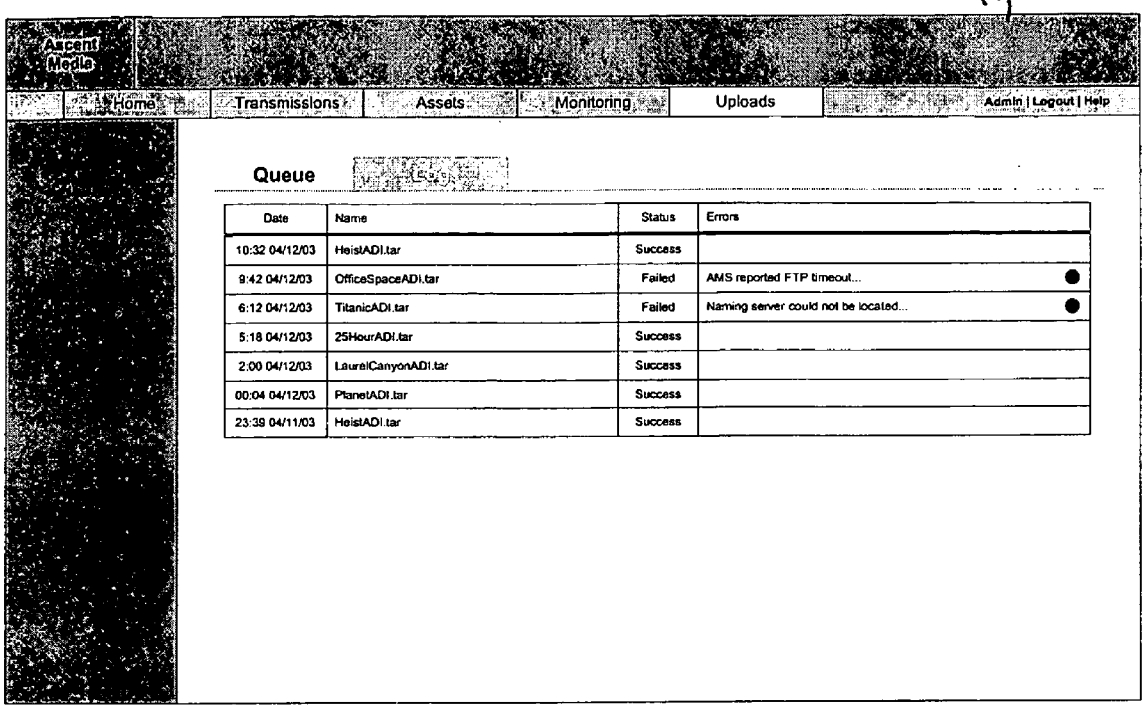
FIG. 4(p) illustrates an upload log menu of the upload section of the catcher user interface.

An example upload log menu 436 of the upload section 412 of the catcher interface 400 is shown in FIG. 4(p). The upload log menu 436 displays, preferably in tabular or grid form, the date and time when an upload operation completed, the name of the multimedia asset package, the outcome of the upload operation, and any error messages associated with the upload operation.

In addition to the aforementioned sections, the catcher interface 400 preferably includes an administration section 414 that includes key management 438, system configuration 440, and user management 442 menus to enable the MSO to further monitor and manage the operation of the catcher 200.

The VOD server 250 provides multimedia assets to the end users of the MSO upon request by the end users. The MSO may implement validation logic and business rules when providing multimedia assets to the end users to provide multimedia assets only when an end user's request complies with the validation logic or business rules. For example, a content provider may place a restriction on viewers of a particular multimedia asset, such as, e.g., limiting the authorized viewers to certain households or age groups. These restrictions are included in metadata and XML files included with the multimedia asset package. In this example, when the VOD server 250 receives a request from an end user for a multimedia asset, the VOD server 250 will implement validation logic and business rules to determine whether the end user is authorized by the content provider to view the multimedia asset. If the VOD server 250 determines that the end user is authorized to view the multimedia asset after reviewing the metadata and XML files included with the asset, the VOD server 250 then transmits the multimedia asset to the requesting end user 254. The VOD server 250 may transmit the multimedia asset to the end user 254 using either a suitable network 252, which may be a radio frequency ("RF") network, an IP network, or a satellite network.

Turning back to the overall ADS system 100 that incorporates the catcher 200 of the present invention, the ADS system 100 may incorporate an ADS management interface 258. The ADS management interface 258 enables an operator of the ADS system 100 to track and manage the multimedia assets being transmitted and received within the ADS system 100. For example, the ADS management interface 258 will be operably coupled to each content provider A to D, and will be capable of monitoring (and enable each content provider to monitor) all uplink components, including pitcher appliances 104(A) to 104(D), IP encapsulators 106(A) to 106(D), ADS staging systems 102(A) to 102(D), and the components of the satellite uplink facilities 108(A) to 108(D), including any modulators incorporated therein. The ADS management interface 258 is also responsible for monitoring all uplink equipment maintained by the content providers.

The ADS management interface 258 also enables the operator or the content providers to monitor the operation of any catchers 200 used with the ADS system 100 to ensure that each catcher 200 is operating properly. On the MSO side of the ADS system 100, the ADS management interface 258 will be operably coupled to the MSO and will be capable of being used to monitor all downlink components, including satellite downlink facilities 112, catchers 200, and VOD servers 250. The ADS management interface 258 aggregates the operating characteristics of the catcher 200, and is able to report these characteristics to the MSO. Any operating issues for the catcher 200 may be diagnosed using the ADS management interface 258. Additionally, software and operating system updates to the catcher 200 may be delivered via the ADS management interface 258. In one embodiment, the ADS management interface 258 implements simple network management protocol ("SNMP") technology and enables the operator to monitor the ADS system 100 via a standard local area network ("LAN") management system. The ADS management interface 258 may utilize SNMP, HTTP, or email to receive alarms from the catcher 200.

In one embodiment, the ADS management interface 258 receives and aggregates all of the transmission acknowledgements sent by the catcher 200. The operator or a content provider may then access the ADS management interface 258 to drill-down and view the transmission details for any particular site. These details include the multimedia assets provided to the end users or consumers of the MSO. Statistics and data regarding the transmission acknowledgements and the use of the multimedia assets by the MSO's end users are preferably archived in a database, and a user may use the ADS management interface 258 to search for information regarding past transfer activity at any given MSO site.

One data management system suitable for use as the ADS management interface 258 is disclosed in U.S. Provisional Application No. 60/429,966, filed Nov. 27, 2002, the disclosure of which is fully and expressly incorporated herein by reference.

The overall ADS system 100 preferably incorporates file-based encryption techniques to ensure that multimedia asset packages are securely transmitted from content providers to MSOs, and from MSOs to end-users. The file-based encryption employed by the ADS system 100 may integrate multiple encryption algorithms, and also provide a mechanism for distributing encryption keys. The encryption keys are stored in a secure manner by the content providers and the MSOs.

Though the invention has been described with respect to specific preferred embodiments, many variations and modifications will become apparent to those skilled in the art. It is therefore the intention and expectation that the appended claims be interpreted as broadly as possible in view of the prior art in order to include all such variations and modifications.

What is claimed is:

1. A method comprising:
   assigning a unique process identification number (PID) to a frequency band used by each of a plurality of multimedia content providers;
   simultaneously receiving a plurality of data segments from the plurality of multimedia content providers, wherein the data segments are tracked using the PID assigned to the frequency band used by each multimedia content provider;
   reconstructing a multimedia asset package transmitted by the multimedia content provider by compiling the plurality of data segments that constitute the multimedia asset package; and
   providing the multimedia asset package to a video-on-demand server that transmits at least a portion of the multimedia asset package to an end user.

2. The method of claim 1, wherein simultaneously receiving the plurality of data segments comprises receiving at least three data segments simultaneously from different multimedia content providers.

3. The method of claim 1, wherein simultaneously receiving the plurality of data segments comprises simultaneously receiving the plurality of data segments on different frequency bands.

4. The method of claim 1, wherein simultaneously receiving the plurality of data segments comprises receiving data segments from each multimedia content provider using a separate data receiver card for each frequency band used by each content provider.

5. The method of claim 1, further comprising:
   providing a backchannel connection to each multimedia content provider to enable the multimedia content provider to track the receipt of data segments transmitted by the multimedia content provider.

6. The method of claim 5, further comprising:
   providing acknowledgements of receipt of a multimedia asset package to the multimedia content provider using the backchannel connection.

7. The method of claim 5, wherein the backchannel connection is a network connection chosen from the group consisting of an internet connection, a public switched telephone network (PSTN) connection, and a virtual private network (VPN) connection.

8. The method of claim 1 wherein reconstructing the multimedia asset package comprises:
validating the multimedia asset package to confirm successful receipt of the multimedia asset package.

9. The method of claim 8, wherein validating the multimedia asset package comprises:
receiving metadata that accompanies the data segments of the multimedia asset package; and
analyzing the metadata to determine whether the complete multimedia asset package is received.

10. The method of claim 8, wherein validating the multimedia asset package occurs before providing the multimedia asset package to the video-on-demand server.

11. The method of claim 1 further comprising:
receiving a request for a movie file from the multimedia asset package from the end user;
comparing metadata associated with the multimedia asset package with validation logic and business rules restricting use of the movie file; and
providing the movie file to the end user if the metadata complies with the validation logic and business rules.

12. The method of claim 1, further comprising:
enabling a user to determine an order in which multimedia asset packages, including the multimedia asset package, are provided to the video-on-demand server.

13. A method comprising:
assigning a unique process identification number (PID) to each of a plurality of frequency bands used by a plurality of multimedia content providers;
receiving a plurality of multimedia data segments from the plurality of multimedia content providers, wherein the multimedia data segments are received simultaneously, the multimedia data segments are tracked using the PIDs, and the plurality of multimedia data segments form a complete multimedia asset package;
forming the complete multimedia asset package using the plurality of multimedia data segments;
validating the complete multimedia asset to confirm successful receipt of the complete multimedia asset; and
providing each complete multimedia asset package to a video-on-demand server that transmits multimedia assets to end users.

14. The method of claim 13, wherein receiving the plurality of multimedia data segments comprises simultaneously receiving at least three multimedia data segments simultaneously from three different multimedia content providers.

15. The method of claim 13, wherein receiving the plurality of multimedia data segments comprises simultaneously receiving the plurality of multimedia data segments from different multimedia content providers on different frequency bands, and the multimedia data segments for a complete multimedia asset package transmitted by a particular multimedia content provider are transmitted on a common frequency band.

16. The method of claim 13, wherein receiving the plurality of multimedia data segments comprises receiving the multimedia data segments from different multimedia content providers using a separate data receiver card for each different frequency band used by the content providers.

17. The method of claim 13, further comprising:
providing a backchannel connection to each multimedia content provider to provide each multimedia content provider with acknowledgements of either successful or unsuccessful receipt of a complete multimedia asset package.

18. The method of claim 17, wherein the backchannel connection is a network connection chosen from the group consisting of an internet connection, a public switched telephone network (PSTN) connection, and a virtual private network (VPN) connection.

19. The method of claim 13, wherein validating the complete multimedia asset package comprises:
receiving metadata that accompanies the multimedia data segments of the complete multimedia asset package; and
analyzing the metadata to determine whether the complete multimedia asset package has been received.

20. The method of claim 13, wherein validating the complete multimedia asset package occurs before providing the complete multimedia asset package to the multimedia server.

21. The method of claim 13, further comprising:
providing a portion of the complete multimedia asset package to a requesting end user by comparing metadata associated with the complete multimedia asset package with validation logic and business rules governing authorized users of the asset package, and transmitting the portion of the complete multimedia asset package to the end user if the metadata complies with the validation logic and business rules.

22. A multimedia catcher receiver, comprising:
a multimedia network interface unit to simultaneously receive a plurality of multimedia data segments sent from a plurality of multimedia content providers and to provide the multimedia data segments;
a receive unit coupled to the multimedia network interface unit to reconstruct a complete multimedia asset package from the plurality of multimedia data segments provided by the multimedia network interface unit, and to validate the complete multimedia asset package; and
a content management system to receive multimedia asset packages from the receive unit, manage the received multimedia asset packages, and provide the multimedia asset packages to a multimedia server;
wherein each frequency band used by a multimedia content provider is assigned a unique process identification number (PID), and the multimedia asset packages are tracked using at least the PID assigned to the frequency band used by the multimedia content provider.

23. The multimedia catcher receiver of claim 22, wherein the multimedia network interface unit comprises a plurality of data receiver cards configured to receive satellite transmissions.

24. The multimedia catcher receiver of claim 22, wherein the multimedia network interface unit comprises a plurality of data receiver cards configured to receive satellite transmissions and a network interface card configured to receive terrestrial transmissions.

25. The multimedia catcher receiver of claim 24, wherein the network interface card comprises an ethernet card.

26. The multimedia catcher receiver of claim 22, wherein the receive unit comprises a backchannel network to provide a communication pathway between the multimedia catcher receiver and the plurality of multimedia content providers to provide acknowledgements of successful receipt of multimedia asset packages to the multimedia content providers.

27. The multimedia catcher receiver of claim 26, wherein the backchannel network is a network connection chosen from the group consisting of an internet connection, a public switched telephone network (PSTN) connection, and a virtual private network (VPN) connection.

28. The multimedia catcher receiver of claim 22, comprising an asset receive unit coupled to the receive unit and to the content management system, and capable of processing multimedia asset packages from the receive unit and multimedia asset packages received from a local source.

29. The multimedia catcher receiver of claim 28, wherein the asset receive unit comprises at least one data input unit taken from the group consisting of a digital versatile disk (DVD)-based drive and a file transfer protocol (FTP) server interface.

\* \* \* \* \*